United States Patent
Lim et al.

(10) Patent No.: US 9,419,257 B2
(45) Date of Patent: Aug. 16, 2016

(54) HIGH VOLTAGE BATTERY FOR VEHICLE

(71) Applicants: HYUNDAI MOTOR COMPANY, Seoul (KR); KIA MOTORS CORPORATION, Seoul (KR)

(72) Inventors: Do Kyoung Lim, Gwangmyeong-Si (KR); Jae Hoon Choi, Gunpo-Si (KR); Suk Hyung Kim, Gunpo-Si (KR); Dong Gun Kim, Gunpo-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 14/459,306

(22) Filed: Aug. 13, 2014

(65) Prior Publication Data

US 2015/0162574 A1 Jun. 11, 2015

(30) Foreign Application Priority Data

Dec. 6, 2013 (KR) .................... 10-2013-0151883

(51) Int. Cl.
*H01M 2/08* (2006.01)
*H01M 2/02* (2006.01)
*H01M 2/12* (2006.01)
*H01M 2/36* (2006.01)

(52) U.S. Cl.
CPC ............ *H01M 2/024* (2013.01); *H01M 2/0275* (2013.01); *H01M 2/12* (2013.01); *H01M 2/362* (2013.01); *H01M 2200/20* (2013.01); *H01M 2220/20* (2013.01)

(58) Field of Classification Search
CPC .......................... H01M 10/647; H01M 10/625
See application file for complete search history.

(56) References Cited

U.S. PATENT DOCUMENTS

2009/0130552 A1* 5/2009 Kim ...................... H01M 2/361
429/175
2009/0311586 A1* 12/2009 Chung ................ H01M 2/1077
429/120

FOREIGN PATENT DOCUMENTS

| JP | 2006-179442 A | 7/2006 |
|---|---|---|
| KR | 10-1082498 B1 | 6/2009 |
| KR | 10-2011-0030165 A | 3/2011 |
| KR | 10-1037042 B1 | 5/2011 |
| KR | 10-2011-0072733 A | 6/2011 |
| KR | 10-2013-0012665 A | 2/2013 |

OTHER PUBLICATIONS

Korean Office Action dated Sep. 30, 2014 issued in Korean Application No. 10-2013-0151883.

* cited by examiner

*Primary Examiner* — Stewart Fraser
*Assistant Examiner* — Olatunji Godo
(74) *Attorney, Agent, or Firm* — McDermott Will & Emery LLP

(57) ABSTRACT

A high voltage battery includes an electrode assembly. A pouch-shaped case is sealed by an edge portion to cover the electrode assembly and has an open inlet formed at one side of the case to allow an electrolyte to be injected to the case therethrough. An outlet is connected to the inlet and discharges gas generated inside the case outside a vehicle.

6 Claims, 6 Drawing Sheets

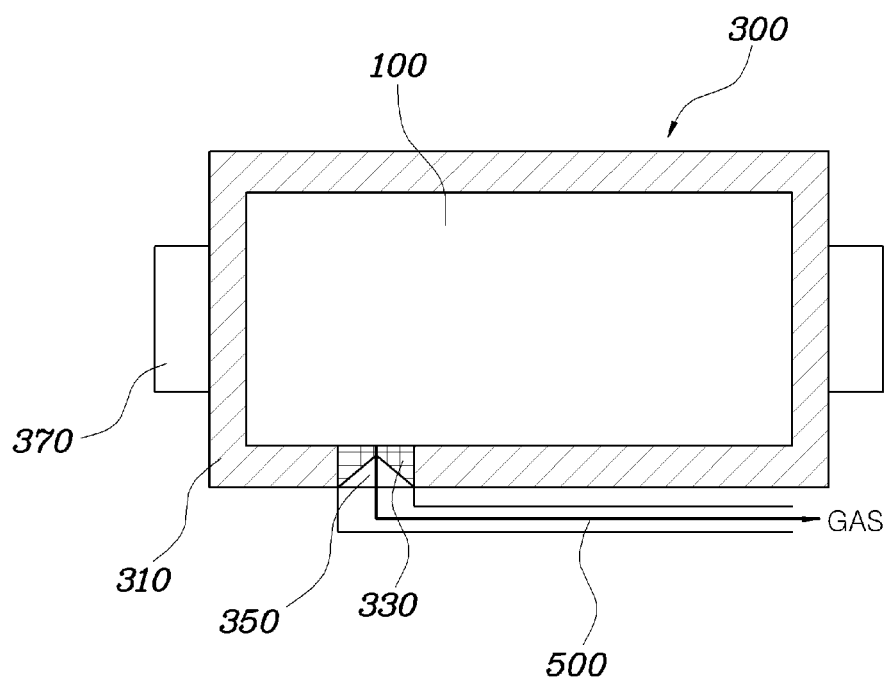

HIGH VOLTAGE BATTERY FOR VEHICLE

CROSS REFERENCE TO RELATED APPLICATION

The present application claims the benefit of priority to Korean Patent Application Number 10-2013-0151883 filed on Dec. 6, 2013, the entire contents of which is incorporated herein for all purposes by this reference.

TECHNICAL FIELD

The present disclosure relates to a high voltage battery for overcoming various dangerous factors that adversely affect safety when a pouch type secondary battery of a high voltage battery is overcharged or is exposed to a high temperature.

BACKGROUND

A chargeable and dischargeable secondary battery has attracted attentions as a power source of an electric car, a hybrid electric car, etc., which has been proposed for overcoming air pollution of a conventional gasoline vehicle, diesel vehicle, and so on, which use fossil fuel.

Mid-to-large sized devices such as mid-to-large sized battery systems of vehicles formed by electrically connecting a plurality of battery cells according to the requirements for a high power output and a large capacitance. A pouch type lithium ion polymer secondary battery (a high voltage battery) that is mainly used as a unit battery in the mid-to-large sized battery systems has a relatively large size, excellent stability, and lightweight compared with a battery of the same series used in a small sized device, and thus is advantageous for slim and lightweight portable electronic devices.

However, when an internal pressure of a lithium secondary battery increases due to overcharging and swelling whereby a pouch type case swells occurs. When swelling occurs, a battery portion is modified, and thus, the battery is partially short-circuited.

In addition, when the battery is overcharged or exposed to a high temperature, gas with a high igniting possibility is generated due to a reaction between an electrolyte and an active material layer of a pole plate or a decomposition reaction of the electrolyte and the active material layer, thereby causing an ignition or an explosion of the battery.

Accordingly, Korean Patent Laid-Open Publication No. 10-1082498 A discloses a pouch type battery includes a pouch type case including a first resin layer, a second resin layer, and a metallic layer disposed between the first resin layer and the second resin layer. An electrode assembly is disposed in the pouch type case, wherein a venting portion is formed in the pouch type case. A total thickness of the venting portion corresponding to the metallic layer, the first resin layer, and the second resin layer is smaller than a thickness of the venting portion corresponding to the remaining portion.

However, the aforementioned pouch type battery has no path for discharging gas generated in the pouch type case. When the gas is introduced into a vehicle, the gas may adversely affect passengers or may react to a spark and so on to cause an explosion.

Accordingly, there is a need for a high voltage battery including a safety device that overcomes an internal pressure of a battery, which reaches a reference level, and rapidly prevents swelling to originally prevent damage or an explosion.

The description of the related art is to aid in understanding of the present disclosure and is not to be construed as conventional arts that are already known to those of ordinary skill in the art.

SUMMARY

An aspect of the present disclosure provides a high voltage battery including a safety device that overcomes an internal pressure of the battery, which reaches a reference level, and rapidly prevents swelling to originally prevent damage or an explosion.

According to an exemplary embodiment of the present disclosure, a high voltage battery includes an electrode assembly. A pouch-shaped case is sealed by an edge portion to cover the electrode assembly and has an open inlet formed at one side of the case to inject an electrolyte to the case therethrough. An outlet is connected to the open inlet and discharges gas generated in the case outside a vehicle.

The inlet of the case may be perpendicular to the electrode assembly.

One side of the edge portion of the case is wider than the other side and the inlet and the outlet are formed at the wider side.

The inlet may include a stress concentration portion formed therein, which easily break when the gas is generated inside the case.

The stress concentration portion may have a notch shape having a tip portion directed toward the electrode assembly.

The outlet may be in parallel to the electrode assembly and an end portion of the outlet may be bent by a set length.

The outlet may be in perpendicular with the inlet.

The outlet may be separately formed and may be coupled to the inlet of the case.

BRIEF DESCRIPTION OF THE DRAWINGS

FIGS. 4 to 6 are diagrams illustrating a high voltage battery according to another embodiment of the present disclosure.

DETAILED DESCRIPTION

Hereinafter, a high voltage battery according to an exemplary embodiment of the present disclosure will be described with reference to the accompanying drawings.

Figure 1:
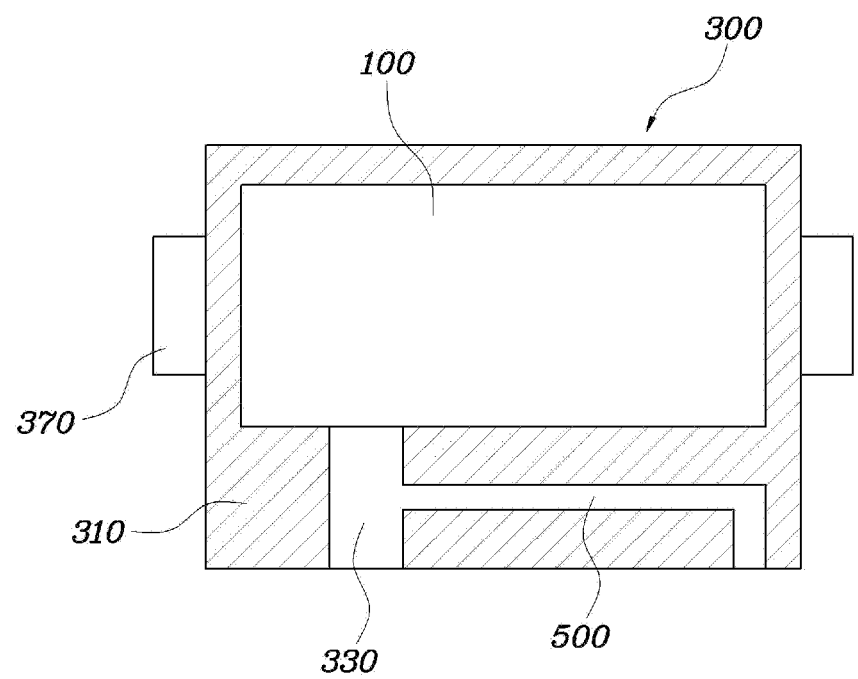
FIGS. 1 to 3 are diagrams illustrating a high voltage battery according to an embodiment of the present disclosure.
Figure 2:
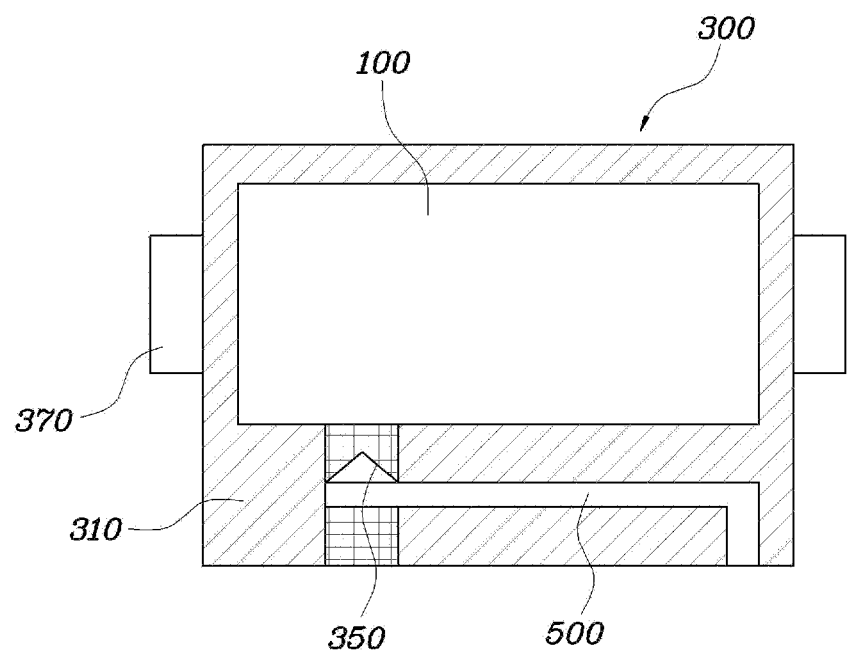
Figure 3:
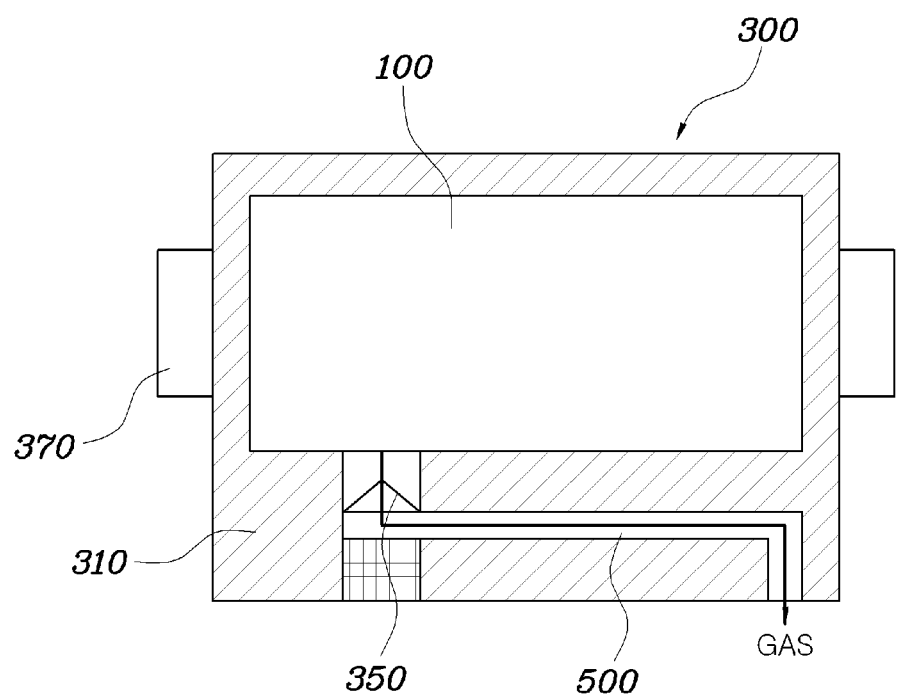

FIGS. 1 to 3 are diagrams illustrating a high voltage battery according to an embodiment of the present disclosure. The high voltage battery according to the present embodiment includes an electrode assembly 100. A pouch-shaped case 300 is sealed by an edge portion 310 to cover the electrode assembly 100 and has an open inlet 330 at one side of the case 300 to allow an electrolyte to be injected to the case 300 therethrough. An outlet 500 is connected to the inlet 330 and to discharge gas generated in the case 300 outside a vehicle.

As illustrated in FIG. 1, the case 300 has a rectangular shape and includes cell taps 370 formed on opposite sides. The electrode assembly 100 is coupled to the case 300. The inlet 330 for injecting an electrolyte into the case 300 is formed at the edge portion 310. The inlet 330 may be perpendicular to the electrode assembly 100 to minimize an area of the inlet 330, thereby maintaining a vacuum state. In particular, the edge portion 310 of the case 300 is configured in such a way that one side of the edge portion 310 is wider than the other side, and the inlet 330 and the outlet 500 are formed at the wider side.

A stress concentration portion 350 that may easily break is formed in the inlet 330 in order to easily discharge the gas out of the case 300 when the gas is generated in the case 300 to cause swelling. In FIGS. 1 to 3, the stress concentration portion 350 has, but is not limited to, a notch shape having a tip portion formed toward the electrode assembly 100, but may have any shape such as a notch shape or a round shape as long as the electrode assembly 100 is pressurized to concentrate stress.

As seen from FIG. 2, the inlet 330 of the case 300 is sealed by sealing the remaining portion except for the stress concentration portion 350 when filling of an electrolyte is completed. Even if the stress concentration portion 350 may be separately formed, according to the present embodiment, the remaining portion except for the stress concentration portion 350 may be sealed to form the stress concentration portion 350, thereby preventing an increase in production costs.

In addition, the outlet 500 connected out of the case 300 is formed at the stress concentration portion 350 and is formed perpendicular to the inlet 330. The outlet 500 is formed at the wider side of the edge portion 310 of the case 300 and is in parallel to the electrode assembly 100. An end portion of the outlet 500 is bent by a set length so as to discharge the gas generated in the case 300 out of the vehicle.

FIG. 3 illustrates a case in which stress concentrates on the stress concentration portion 350 such that the inlet 330 of the electrode assembly 100 breaks when swelling occurs. When gas is generated in the case 300, if swelling occurs, the gas pressurizes the case 300 such that the stress concentration portion 350 of the inlet 330, which is the weakest portion of the case 300, breaks. The gas generated in the case 300 is discharged out of the vehicle through the inlet 330 that breaks and the outlet 500. With respect to the stress concentration portion 350, a front portion of the inlet 330 breaks, but a rear portion thereof does not break, such that the gas generated in the case 300 is not discharged through other portions except the outlet 500.

Figure 4:
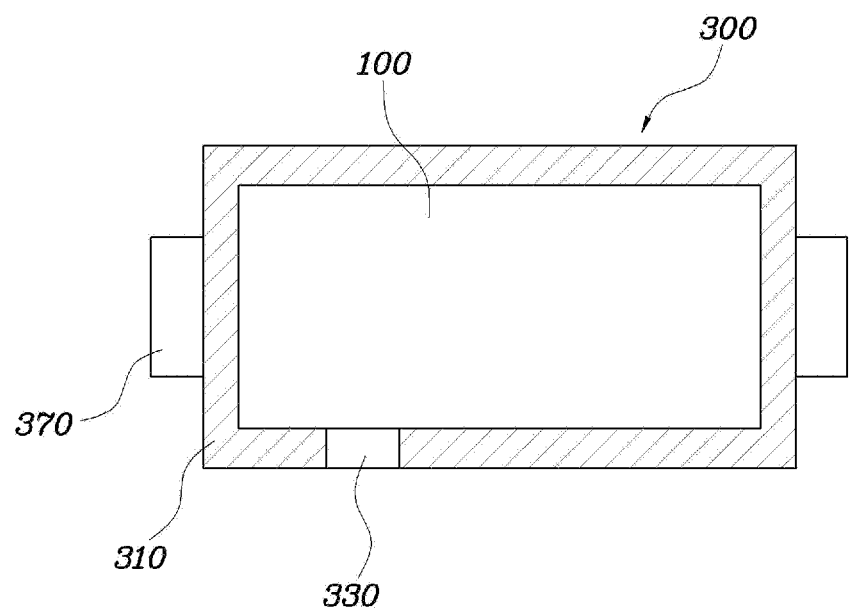
Figure 5:
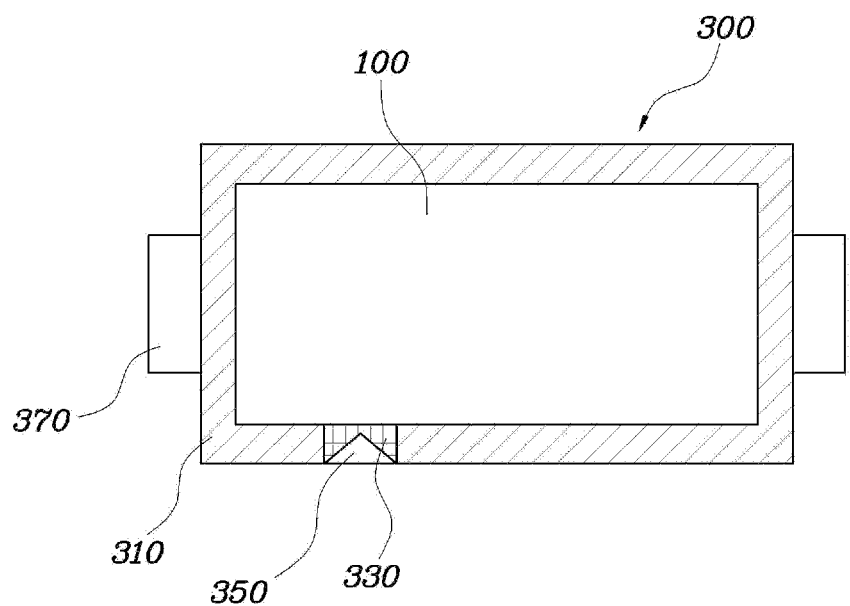

FIGS. 4 to 6 are diagrams illustrating a high voltage battery according to another embodiment of the present disclosure. The high voltage battery according to the present embodiment includes an electrode assembly 100. A pouch-shaped case 300 is sealed by an edge portion 310 to cover the electrode assembly 100 and has an open inlet 330 formed at one side of the case 300 to allow an electrolyte to be injected to the case 300 therethrough. An outlet 500 is connected to the inlet 330 and discharges gas generated in the case 300 outside a vehicle.

As illustrated in FIG. 4, the case 300 has a rectangular shape and includes cell taps 370 on opposite sides. The electrode assembly 100 is coupled to the case 300. The inlet 330 for injecting the electrolyte into the case 300 is formed in the edge portion 310. The inlet 330 of the case 300 may be formed perpendicular to the electrode assembly 100 to minimize an area of the inlet 330, thereby maintaining a vacuum state. In particular, the edge portion 310 of the case 300 is configured in such a way that four sides have the same width, and the inlet 330 is formed at one side.

Unlike the embodiment illustrated in FIGS. 1 to 3, since it is difficult to form both the inlet 330 and the outlet 500 in the edge portion 310, the outlet 500 is separately formed and is coupled to the edge portion 310 rather than being formed at the edge portion 310.

A stress concentration portion 350 that can easily break is formed in the inlet 330 in order to easily discharge the gas out of the case 300 when the gas is generated in the case 300 to cause swelling. In FIGS. 4 to 6, the stress concentration portion 350 has, but is not limited to, a notch shape having a tip portion formed toward the electrode assembly 100, but may have any shape selected from a notch shape, a round shape, and so on as long as the electrode assembly 100 is pressurized to concentrate stress.

As seen from FIG. 5, the inlet 330 of the case 300 is sealed by sealing the remaining portion except for the stress concentration portion 350 when filling of an electrolyte is completed. Even if the stress concentration portion 350 may be separately formed, according to the present embodiment, the remaining portion except for the stress concentration portion 350 may be sealed to form the stress concentration portion 350.

Since the stress concentration portion 350 needs to easily break when the gas is generated in the case 300 while maximally sealing the case 300, the tip portion is directed to the electrode assembly 100 at an outermost end portion of one side of the edge portion 310 of the case 300, and a front side of the stress concentration portion 350 is sealed to maintain a vacuum state.

FIG. 6 illustrates a case in which stress concentrates on the stress concentration portion 350, such that the inlet 330 of the electrode assembly 100 breaks when swelling occurs. When gas is generated in the case 300, if swelling occurs, the gas pressurizes the case 300 such that the stress concentrates on the tip portion of the stress concentration portion 350, which is a weakest portion of the case 300, and the stress concentration portion 350 breaks to open the inlet 330. The separately formed outlet 500 is coupled to the inlet 330 so as to discharge the gas generated in the case 300 out of the vehicle through the outlet 500.

With regard to use of the conventional pouch type case, when adverse problems such as overcharge, overvoltage, high temperature, short circuit, etc., arise, combustible gas is generated inside the case and combined with an ignition source to cause ignition, an explosion, and so on. Accordingly, with regard to the aforementioned high voltage battery, when a reference amount of gas is generated in the case, if internal pressure reaches a reference level, the stress concentration portion breaks such that the generated gas is discharged out of the vehicle through the outlet to rapidly prevent swelling and to originally prevent ignition or an explosion, thereby ensuring stability of the battery.

In addition, when the pouch type case is used, the gas generated inside the case may be separated from a cooler, and the gas generated inside the case may be discharged out of the vehicle using the outlet and the stress concentration portion, which have a simple structure, to protect a passenger from poisonous gas, thereby preventing a secondary safety accident due to gas.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:
1. A high voltage battery comprising:
an electrode assembly; a pouch-shaped case sealed by an edge portion to cover the electrode assembly, and having an open inlet formed at one side of the case to allow an electrolyte to be injected to the case therethrough and sealed after injecting the electrolyte; and
an outlet connected to the inlet and for discharging gas generated in the case outside a vehicle:
wherein the inlet includes a stress concentration portion formed therein, which easily breaks when the gas is generated inside the case, wherein the stress concentration portion has a notch shape having a tip portion directed toward the electrode assembly.

2. The high voltage battery of claim 1, wherein the inlet of the case is perpendicular to the electrode assembly.

3. The high voltage battery of claim 1, wherein one side of the edge portion of the case is wider than the other side and the inlet and the outlet are formed at the wider side.

4. The high voltage battery of claim 1, wherein the outlet is in parallel to the electrode assembly and an end portion of the outlet is bent by a set length.

5. The high voltage battery of claim 1, wherein the outlet is in perpendicular with the inlet.

6. The high voltage battery of claim 1, wherein the outlet is separately formed and is coupled to the inlet of the case.

* * * * *